United States Patent
Nakao et al.

(10) Patent No.: US 9,242,656 B2
(45) Date of Patent: Jan. 26, 2016

(54) ROLLING STOCK

(75) Inventors: Koji Nakao, Nagoya (JP); Kengo Oohashi, Nagoya (JP)

(73) Assignee: Nippon Sharyo, Ltd., Nagoya-shi (JP)

( * ) Notice: Subject to any disclaimer, the term of this patent is extended or adjusted under 35 U.S.C. 154(b) by 0 days.

(21) Appl. No.: 14/379,969

(22) PCT Filed: Feb. 21, 2012

(86) PCT No.: PCT/JP2012/054038
§ 371 (c)(1),
(2), (4) Date: Aug. 20, 2014

(87) PCT Pub. No.: WO2013/124962
PCT Pub. Date: Aug. 29, 2013

(65) Prior Publication Data
US 2015/0040793 A1    Feb. 12, 2015

(51) Int. Cl.
| B61D 17/00 | (2006.01) |
| B61D 17/02 | (2006.01) |
| B61D 17/06 | (2006.01) |
| B61D 15/06 | (2006.01) |
| B61D 17/04 | (2006.01) |
| B61D 17/08 | (2006.01) |

(Continued)

(52) U.S. Cl.
CPC ............... B61D 17/02 (2013.01); B61D 15/06 (2013.01); B61D 17/04 (2013.01); B61D 17/06 (2013.01); B61D 17/08 (2013.01); B61F 1/02 (2013.01); B61F 1/10 (2013.01)

(58) Field of Classification Search
CPC ................... B61D 15/06; B61D 17/02–17/08; B61F 1/02; B61F 1/10
See application file for complete search history.

(56) References Cited

U.S. PATENT DOCUMENTS

| 2004/0040463 A1* | 3/2004 | Yamamoto | B61D 15/06 105/396 |
| 2007/0214996 A1* | 9/2007 | Nedelik | B61D 17/06 105/238.1 |
| 2007/0261591 A1* | 11/2007 | Bravo | B61C 17/04 105/392.5 |

(Continued)

FOREIGN PATENT DOCUMENTS

| JP | 2001-048016 | 2/2001 |
| JP | 2001-063954 | 3/2001 |

(Continued)

OTHER PUBLICATIONS

International Search Report mailed May 29, 2012, issued for JP/JP2012/054038.

*Primary Examiner* — Jason C Smith
(74) *Attorney, Agent, or Firm* — Locke Lord LLP (57) ABSTRACT

A rolling stock in which a streamlined cab end structure includes: a pair of corner posts having lower half portions joined respectively to a pair of corner post reinforcement member standing upright on opposite end portions of an end beam of the underframe and upper half portions inclined toward the rear of the car body; an upper reinforcement beam laid between upper end portions of the pair of corner posts; a pair of end posts having lower half portions joined respectively to a pair of end post reinforcement members, and upper half portions inclined toward the rear of the car body; and a pair of coupling member respectively coupling upper portions of the pair of end posts and a front end portion of the roof structure, and the upper reinforcement beam has such a strength that the car body can be lifted up from above by use of a crane.

4 Claims, 14 Drawing Sheets

(51) Int. Cl.
*B61F 1/02* (2006.01)
*B61F 1/10* (2006.01)

(56) References Cited

U.S. PATENT DOCUMENTS

| | | | | |
|---|---|---|---|---|
| 2007/0283843 | A1* | 12/2007 | Kawasaki | B61D 17/06 105/396 |
| 2008/0250965 | A1* | 10/2008 | Clark | B61D 15/06 105/413 |
| 2008/0314282 | A1* | 12/2008 | Malfent | B61D 15/06 105/392.5 |
| 2012/0097066 | A1* | 4/2012 | Matsuoka | B61D 15/06 105/342 |
| 2012/0125225 | A1* | 5/2012 | Matsuoka | B61D 15/06 105/396 |
| 2012/0325108 | A1* | 12/2012 | Graf | B61F 1/10 105/392.5 |
| 2013/0098264 | A1* | 4/2013 | Kuroda | B61D 15/06 105/392.5 |
| 2013/0104770 | A1* | 5/2013 | Nakao | B61D 15/06 105/392.5 |
| 2013/0125782 | A1* | 5/2013 | Ishizuka | B61D 15/06 105/392.5 |
| 2013/0239847 | A1* | 9/2013 | Taguchi | B61D 17/06 105/392.5 |
| 2015/0020709 | A1* | 1/2015 | Hayashi | B61F 1/08 105/413 |
| 2015/0033978 | A1* | 2/2015 | Oohashi | B61D 17/06 105/1.1 |
| 2015/0040792 | A1* | 2/2015 | Oohashi | B61D 17/04 105/1.1 |
| 2015/0040793 | A1* | 2/2015 | Nakao | B61D 17/06 105/1.1 |
| 2015/0191180 | A1* | 7/2015 | Langert | B61D 17/00 105/456 |

FOREIGN PATENT DOCUMENTS

| | | |
|---|---|---|
| JP | 2002-302036 A | 10/2002 |
| JP | 2004-268694 | 9/2004 |
| JP | 2005-053306 | 3/2005 |
| JP | 2007-302081 A | 11/2007 |
| JP | 2011-235728 A | 11/2011 |

* cited by examiner

ROLLING STOCK

TECHNICAL FIELD

The present invention relates to a rolling stock, and relates specifically to a construction of a cab end structure in a rolling stock having a streamlined head shape.

BACKGROUND ART

A car body of a rolling stock is formed by joining side structures and end structures to four side portions of an underframe, then joining a roof structure to upper portions of the side structures and the end structures, and attaching outside plates, floor plates, interior decorative members, doors, windows, and the like to the structures. In a general rolling stock, most of the strength of the car body is provided by the underframe. For this reason, when the car body is lifted up by use of a crane, a special lifting tool is engaged with the underframe or with a truck to lift the car body (see for example Patent Document 1). In addition, it is also conducted to reinforce the cab end structure and the end structure as collision countermeasures (see for example Patent Document 2).

PRIOR ART DOCUMENTS

Patent Documents

Patent Document 1: Japanese Patent Application Publication No. 2001-63954
Patent Document 2: Japanese Patent Application Publication No. 2001-48016

SUMMARY OF THE INVENTION

Problem to be Solved by the Invention

When a car body is lifted up in a factory, a lifting tool suitable for the car body can be prepared in advance. However, for example, to lift up a rolling stock that has derailed during running, not only a crane truck but also a lifting tool compatible with the car body needs to be prepared, which contributes to an increase in time for recovery. In addition, the reinforcement for the cab end structure and the end structures, and also for the underframe is mainly against an external force at collision which is applied from the front of the car body, and reinforcement against an external force applied from above or reinforcement for the roof structure has scarcely been conducted so far.

In view of this, an object of the present invention is to provide a rolling stock including a cab end structure of a construction which enables a car body of a rolling stock including a head portion having a streamlined shape to be easily lifted up with a crane.

Means for Solving the Problem

To achieve the above-described object, a rolling stock of the present invention is a rolling stock having a car body formed by joining a cab end structure having a streamlined shape and an end structure respectively to opposite ends of an underframe, side structures, and a roof structure, in which the cab end structure includes: a pair of corner posts having lower half portions joined respectively to a pair of corner post reinforcement member, which stand upright on opposite end portions of an end beam of the underframe, and upper half portions inclined toward rear of the car body; an upper reinforcement beam extending in a car-body width direction, the upper reinforcement beam being joined to and laid between upper end portions of the pair of corner posts; a pair of end posts having lower half portions joined respectively to a pair of end post reinforcement members, which stand upright on inner sides of the corner posts on the end beam, and upper half portions inclined toward the rear of the car body, extending from the inclined upper ends toward the rear of the car body in a horizontal direction, and having rear end portions being joined to the upper reinforcement beam; front face reinforcement members coupling each corner post reinforcement member and the adjacent end post reinforcement member to each other, and the end post reinforcement members to each other, in the car-body width direction; and a pair of coupling members respectively coupling upper portions of the pair of end posts and a front end portion of the roof structure, and the upper reinforcement beam has such a strength that the car body can be lifted up from above.

Moreover, the upper reinforcement beam includes a lifting portion for lifting by use of a crane, and the end post reinforcement members have lower end portions joined to a front face of the end beam.

Effect of the Invention

According to the rolling stock of the present invention, since the upper reinforcement beam joined to the pair of corner posts and the pair of end posts is disposed in the rear side of the upper portion of the cab end structure, it is possible to easily lift up the car body by use of a crane or the like by utilizing the upper reinforcement beam. In addition, it is possible to reinforce not only the front portion of the cab end structure but also the vicinity of the joint portion with the roof structure. Moreover, if lifting portions, for example, eyebolts are provided, or screwed portions for eyebolts are provided, in the upper reinforcement beam, it is possible to easily perform wiring when lifting up the car body by use of a crane. Furthermore, joining the lower end portions of the corner post reinforcement members and the end post reinforcement members to the front face of the end beam allows an external force applied to the corner posts or the end posts to be transmitted to the underframe, making it possible to suppress deformation of the cab end structure.

MODES FOR CARRYING OUT THE INVENTION

Figure 3:
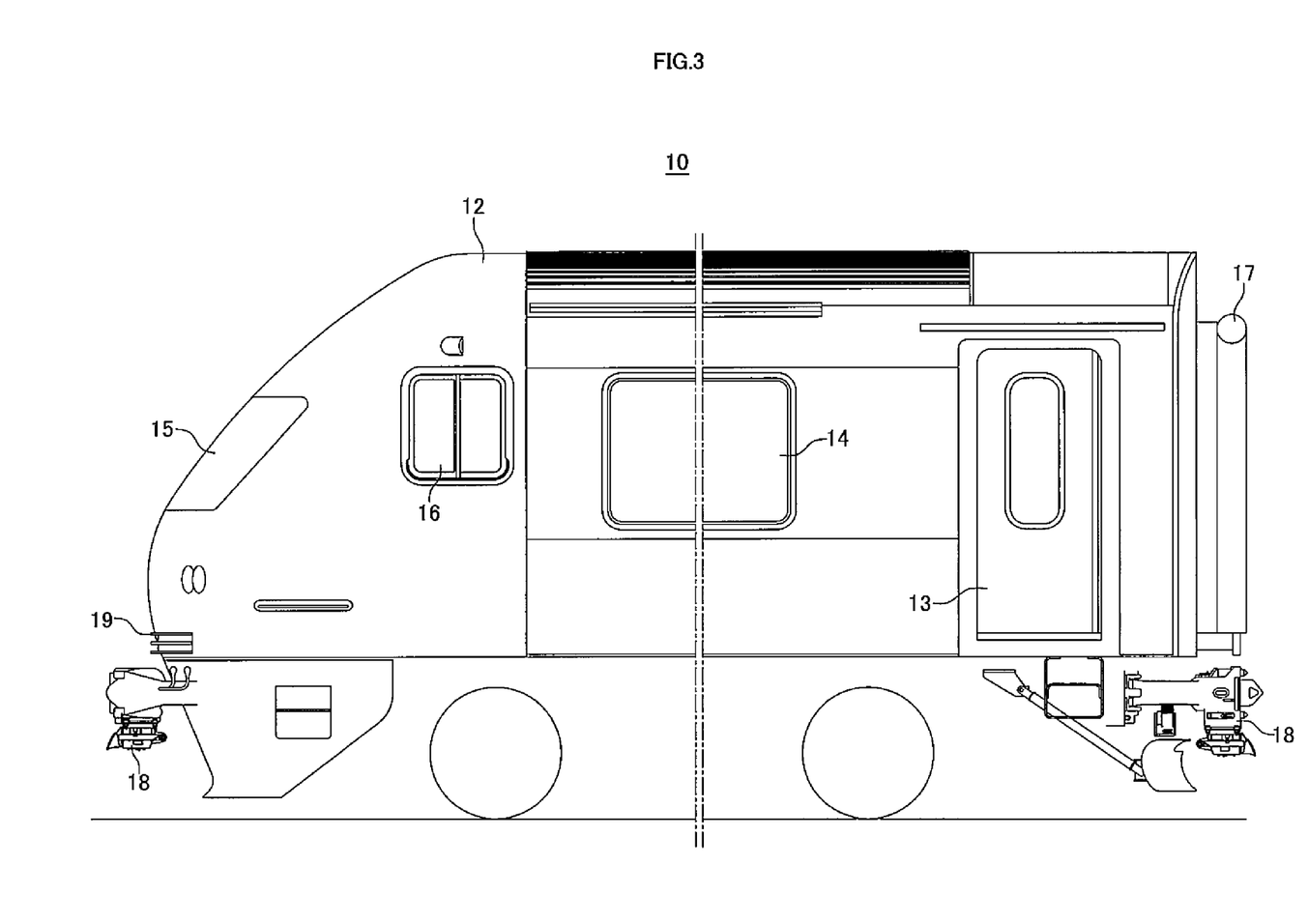
FIG. 3 is a side view showing one embodiment of the rolling stock of the present invention.
Figure 4:
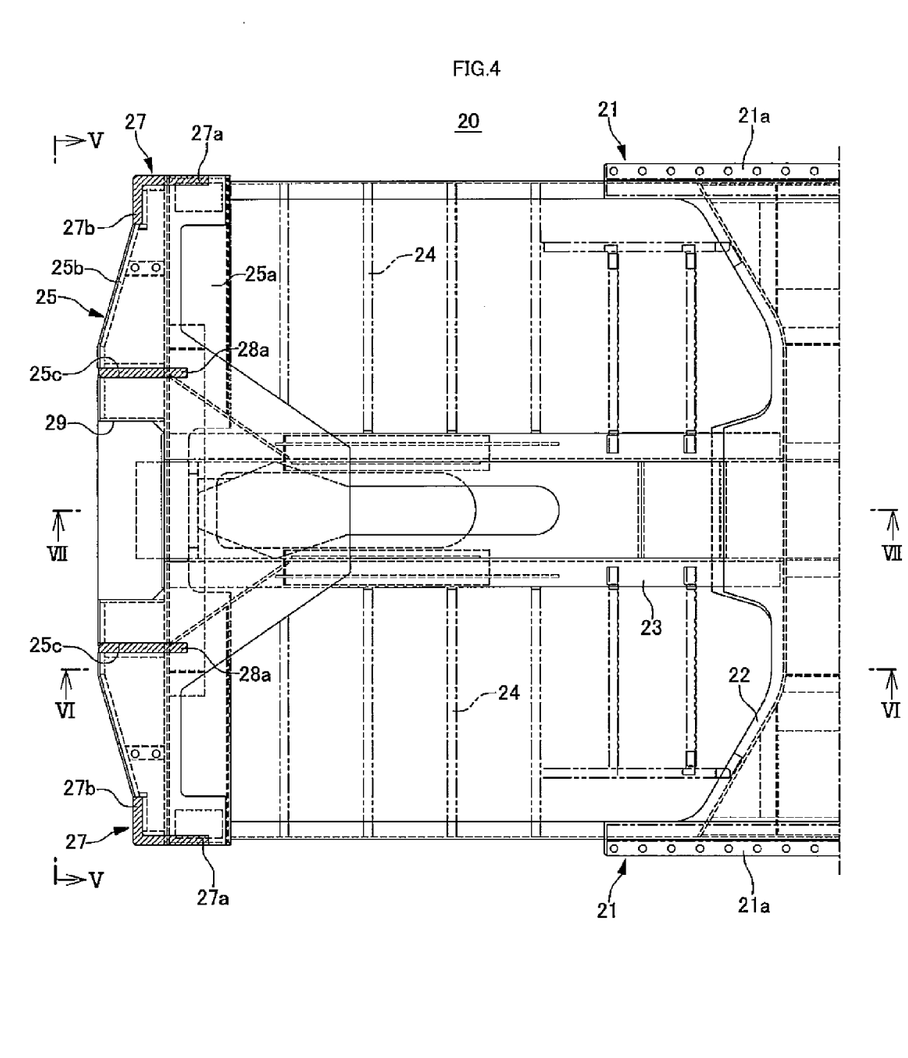
FIG. 4 is a plan view showing a main part of an underframe.
Figure 5:
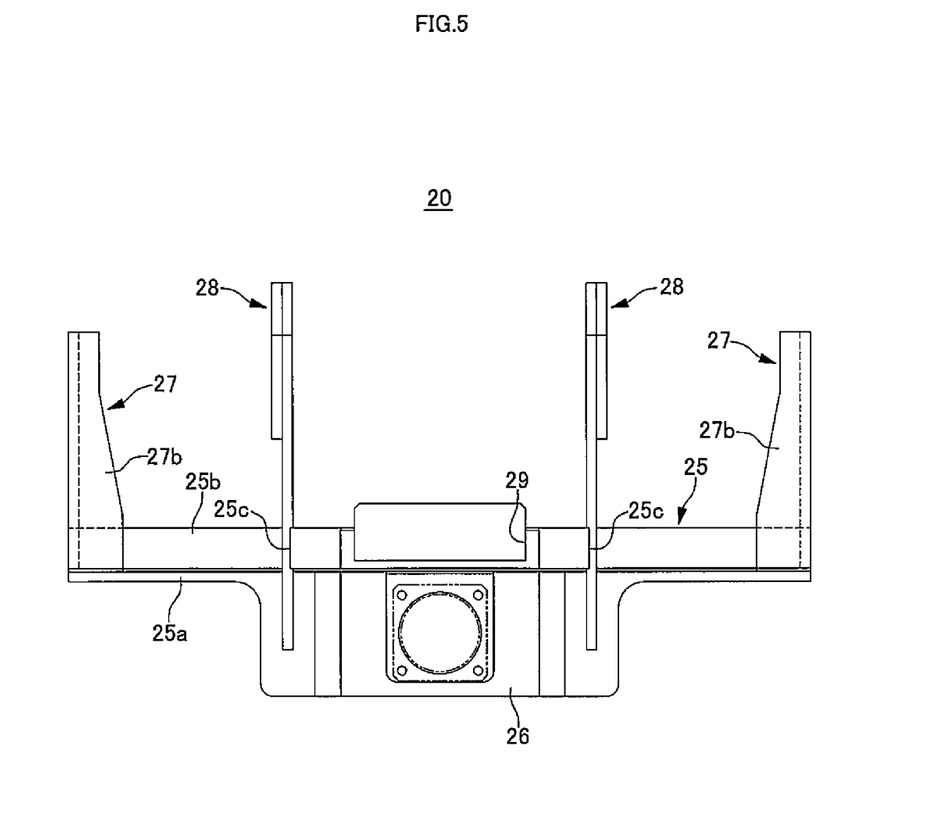
FIG. 5 is a view in a direction of the arrows V-V in FIG. 4.
Figure 6:
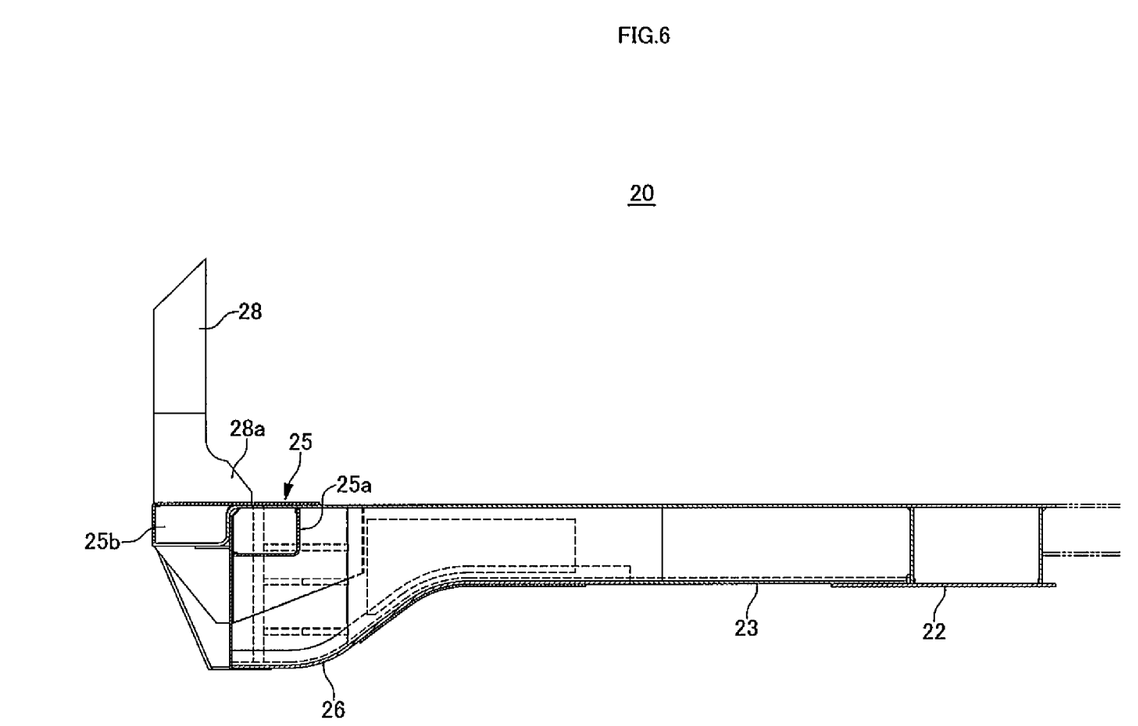
FIG. 6 is a cross-sectional view taken along the line VI-VI in FIG. 4.
Figure 7:
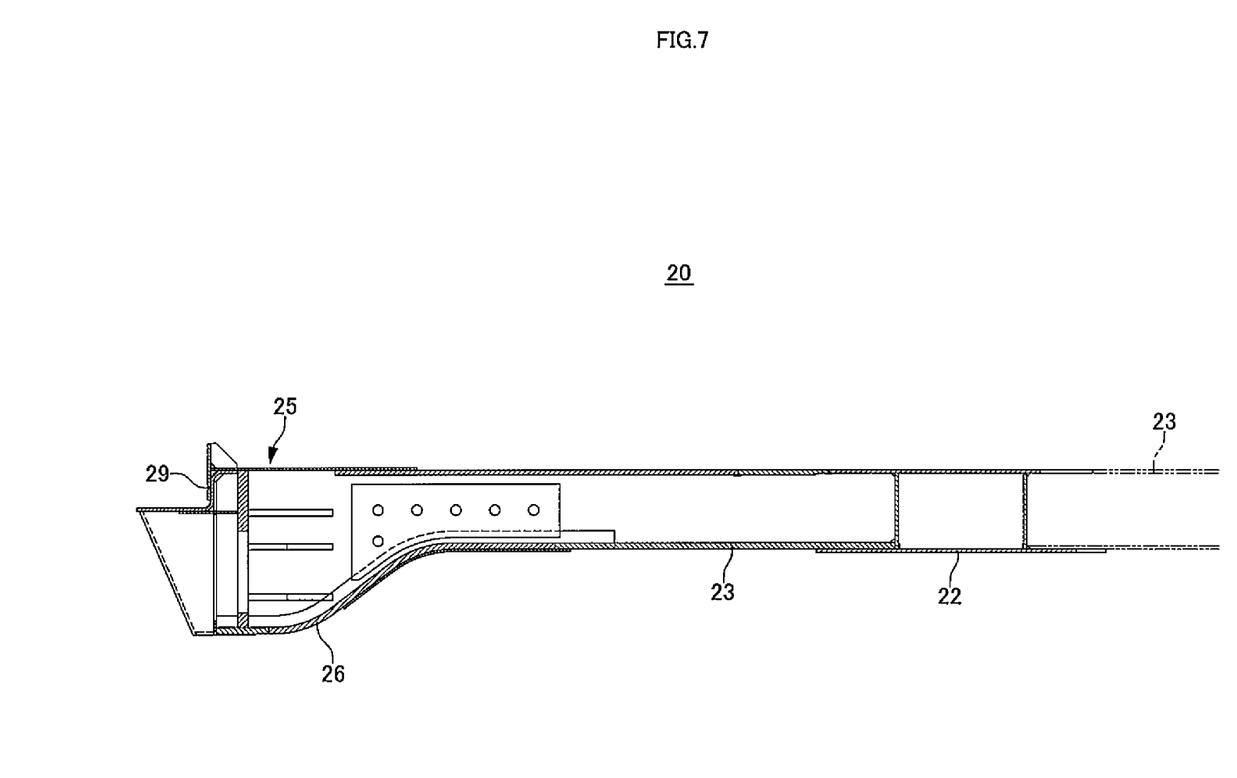
FIG. 7 is a cross-sectional view taken along the line VII-VII in FIG. 4.

The present embodiment shows a first rolling stock 10 having a streamlined shape in a front end of a car body, as shown in FIG. 3. A rolling stock structure 11 forming the first rolling stock 10 includes: an underframe 20; a pair of left and right side structures 30 provided on the opposite sides of the underframe 20; a cab end structure 40 and an end structure 50 provided respectively on the opposite ends of the underframe 20 and the side structures 30; and a roof structure 60 provided to cover upper portions of the side structures 30, the cab end structure 40, and the end structure 50. The cab end structure 40 is formed in a streamlined shape in which an upper half portion is inclined rearward and the opposite side portions are inclined rearward.

The underframe 20 includes: a pair of left and right side beams 21 disposed in a rail direction (a car-body front-rear direction); a pair of front and rear bolster beams 22 disposed in a railroad-tie direction (a car-body width direction) near the front and rear end portions; center beams 23 provided in a center portion of the underframe 20 in parallel with the side beams 21; a plurality of cross beams 24 coupling the side beams 21 and the center beams 23 in the railroad-tie direction; end beams 25 provided respectively on the leading ends of the center beams 23 provided on the car-body opposite end sides of the bolster beams 22. Each of the end beams 25 includes a main end beam 25a being continuous in the railroad-tie direction and corresponding to the width of the car body; and reinforcement end beams 25b provided respectively on the opposite side portions of a front face of the main end beam 25a. In addition, a coupler support frame 26 is provided in a lower portion of the center beam 23 on the car-body end side. Moreover, a pair of left and right corner post reinforcement members 27 and a pair of left and right end post reinforcement members 28, which have heights about half the car-body height, are provided on the end beam 25 in the end portion of the underframe 20 on the cab end structure side. A recess portion 29 having a front face opened for attaching an impact absorbing member is provided in a center portion of a front face of the main end beam 25a between the reinforcement end beams 25b, 25b.

Figure 1:
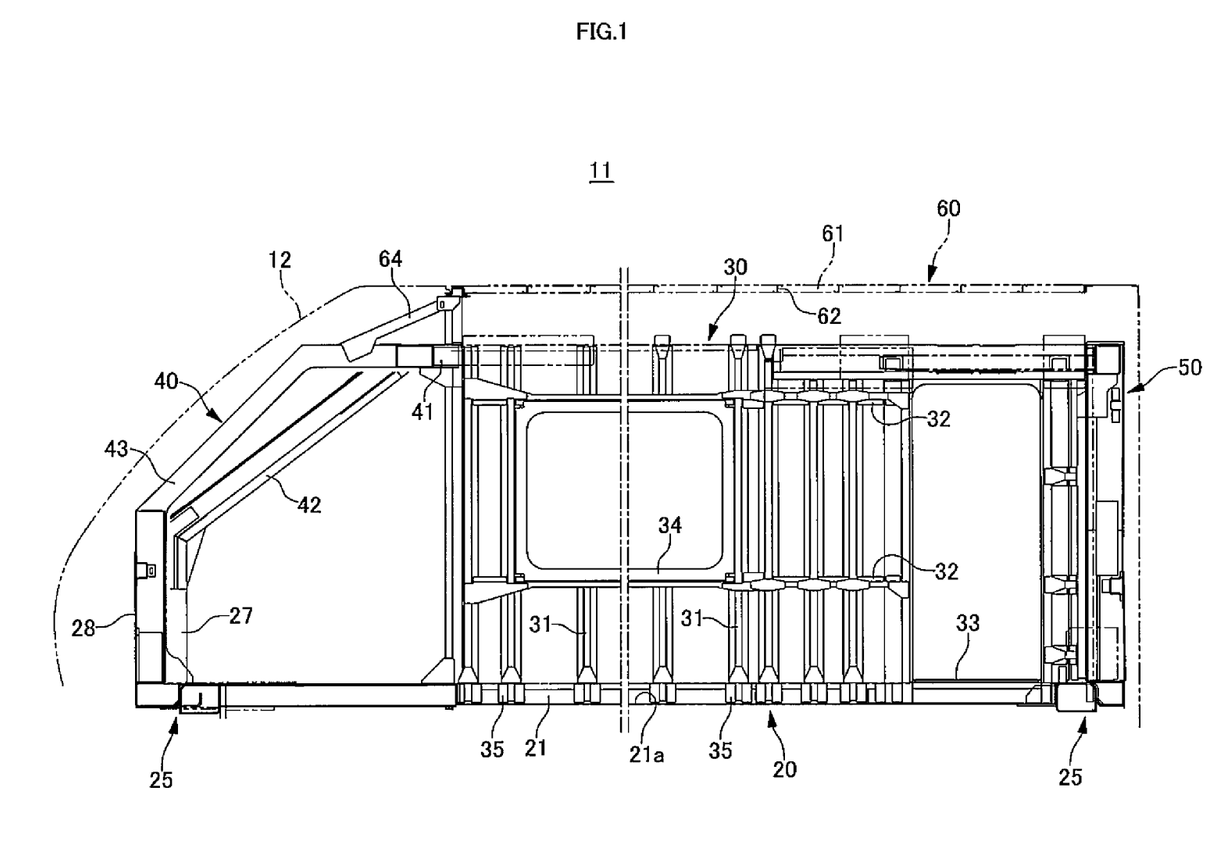
FIG. 1 is a side view of a rolling stock structure showing one embodiment of a rolling stock of the present invention.
Figure 2:
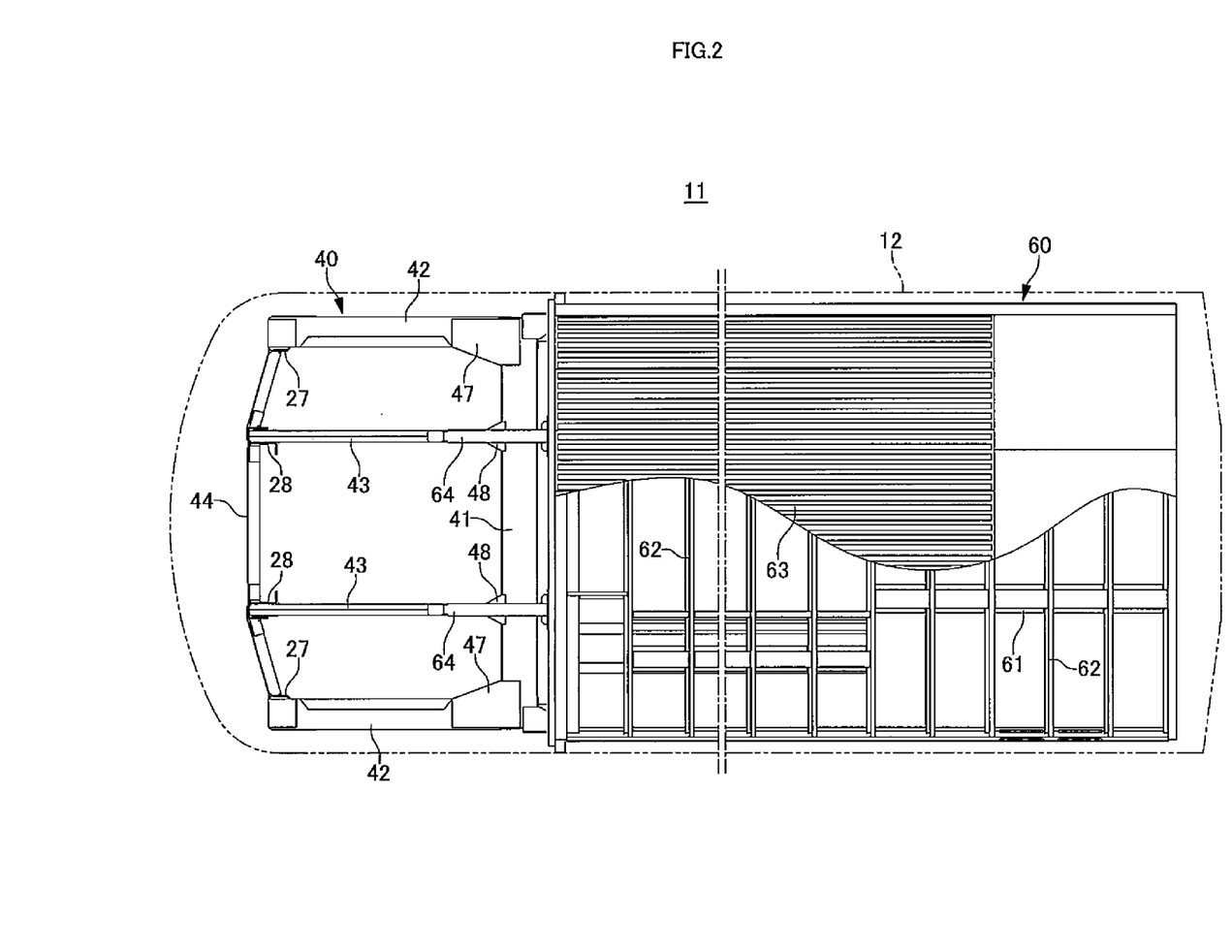
FIG. 2 is a partially cut-away plan view of the rolling stock structure.

The side structures 30 include: a plurality of side posts 31 extending in a vertical direction; a plurality of frame members 32 extending in the car-body front-rear direction; door frame parts 33 forming gate opening portions; and window frame parts 34 forming side-window opening portions. Each of the side posts 31 is bent into a shape such that a lower portion from a middle portion thereof in the up-down direction is inclined toward the inside of the car body so as to conform to the lower-side narrowed structure of the first rolling stock 10. Lower end portions of the side posts 31 are joined to outer faces of the corresponding side beams 21 on lower projecting piece 21a projecting sideward from lower ends of the side beams 21 by means of joint member 35.

Figure 8:
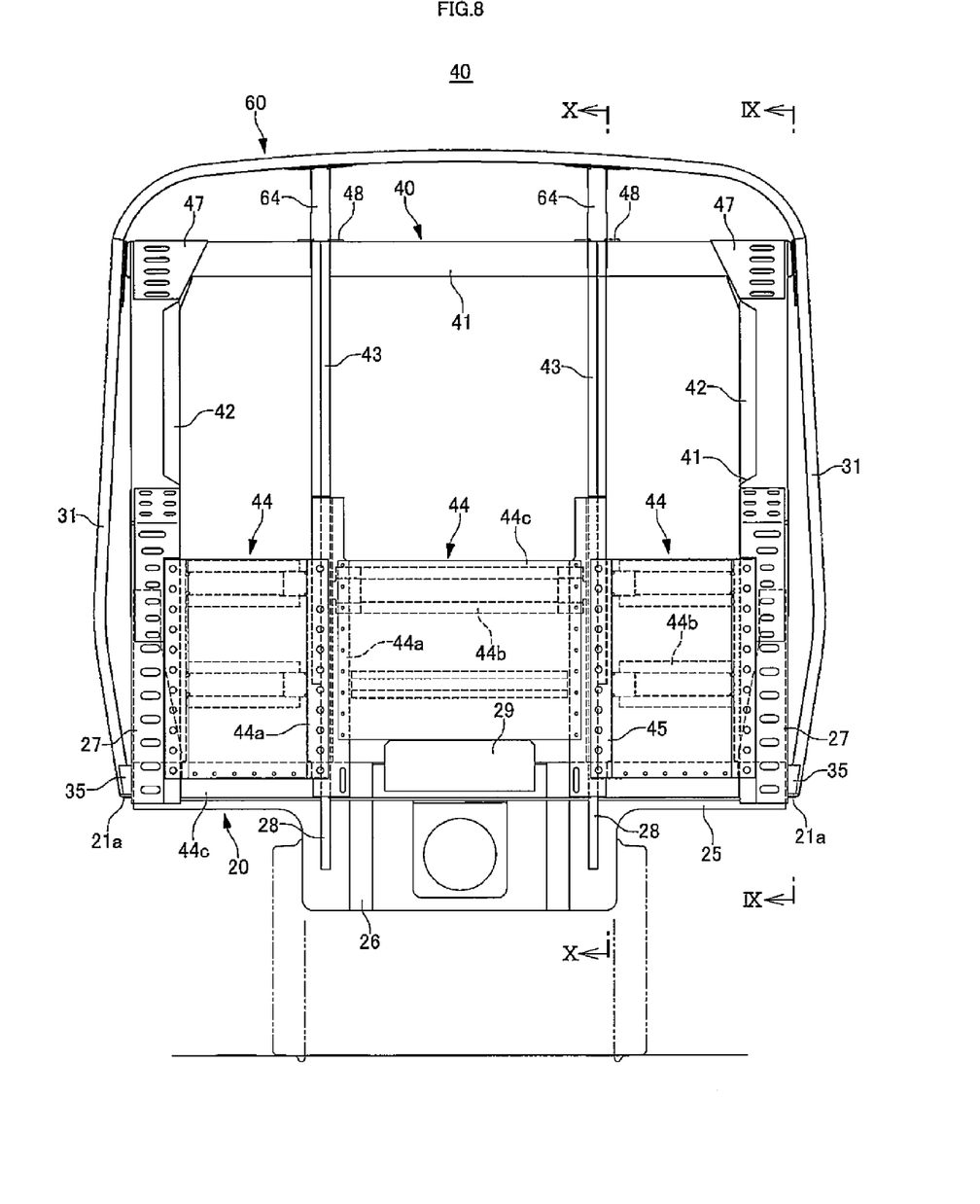
FIG. 8 is a front view of the rolling stock structure.
Figure 9:
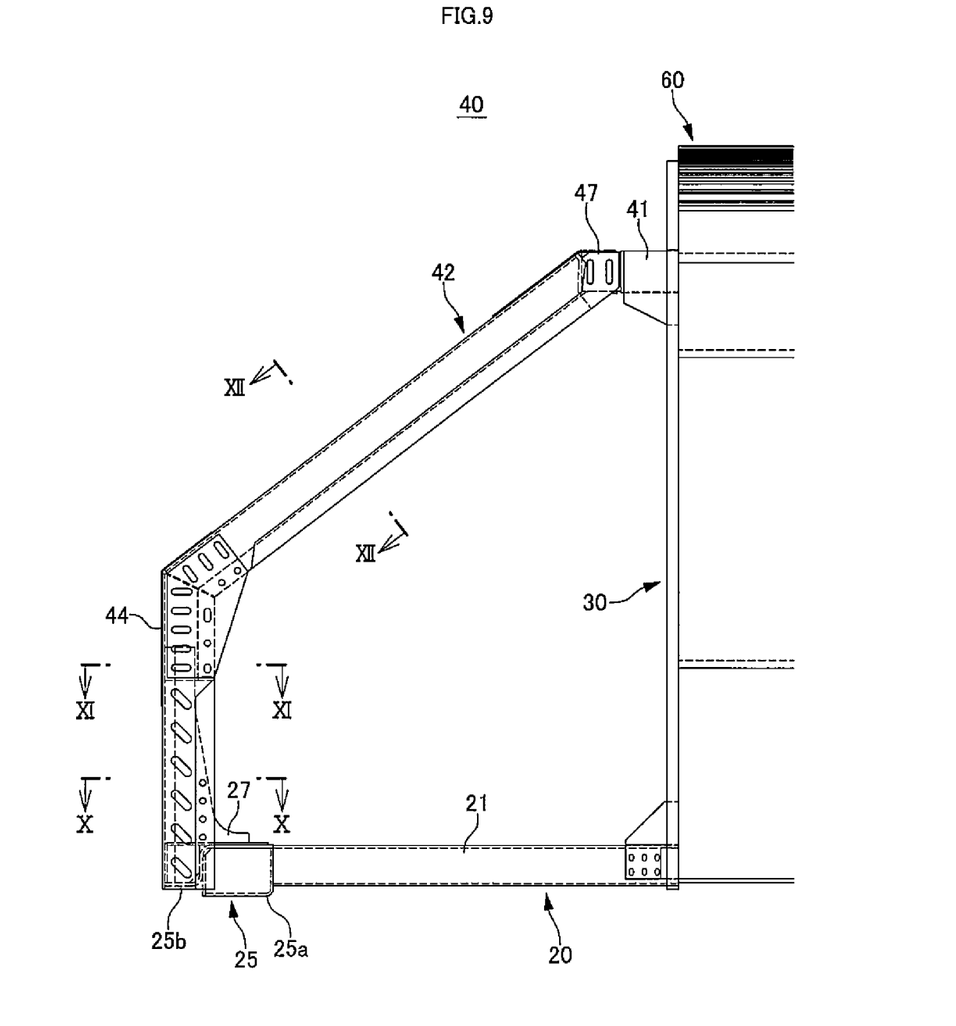
FIG. 9 is a cross-sectional view taken along the line IX-IX in FIG. 8.

The cab end structure 40 is provided with a driver's cabin in a center portion in the car-body width direction. An upper reinforcement beam 41 extending over the entire width in the railroad-tie direction is provided at a joint portion between an upper end portion of a rear side of the cab end structure 40 and upper end portions of head sides of the side structures 30. The front end portion of the cab end structure 40 includes: a pair of corner posts 42, 42 joined at lower half portions to the corner post reinforcement members 27 of the end beam 25 and provided on the opposite end portions in the width direction; a pair of end posts 43, 43 joined at lower half portions to the end post reinforcement members 28 of the end beam 25 on the inside of the car body of the corner posts 42, 42 and provided in a middle portion in the width direction. Each of the corner posts 42 has an upper half portion inclined toward the rear of the car body, and the upper reinforcement beam 41 is laid between upper end portions of the corner posts 42, 42. Each of the end posts 43 has an upper half portion being inclined toward the rear of the car body, extending from the inclined upper end to the rear of the car body in a horizontal direction, and having a rear end portion joined to a front face of the upper reinforcement beam 41.

In addition, front face reinforcement panels 44 covering a lower half portion of the cab end structure 40 are provided between each corner post 42 and the corresponding end post 43, and between the end posts 43. The front face reinforcement panel 44 is formed of vertical frames 44a, horizontal frames 44b, and a front face panel 44c. A front window opening portion 45 is provided above the front face reinforcement panels 44. On the other hand, the end structure 50 on the coupler side is formed in a flat plate shape, and a gangway opening portion (not shown) is provided in a center portion in the width direction.

The roof structure 60 is formed of: pair of long girders 61 disposed on the opposite sides in the rail direction; a plurality of rafters 62 extending in the railroad-tie direction, which are joined orthogonally to the long girders 61; and a roof board 63 joined to outer face sides of the rafters 62. The long girders 61 are joined to upper end portions of the side structures 30, and the rafters 62 on the front and rear ends are joined respectively to an upper end portion of the cab end structure 40 and an upper end portion of the end structure 50. The opposite side portions of the front end of the roof structure 60 and the upper portions of the front ends of the side structures 30 are joined integrally to the opposite end portions of the upper reinforcement beam 41. In addition, the front end of the roof structure 60 and the upper portions of the end posts 43 are coupled by coupling members 64.

Figure 10:
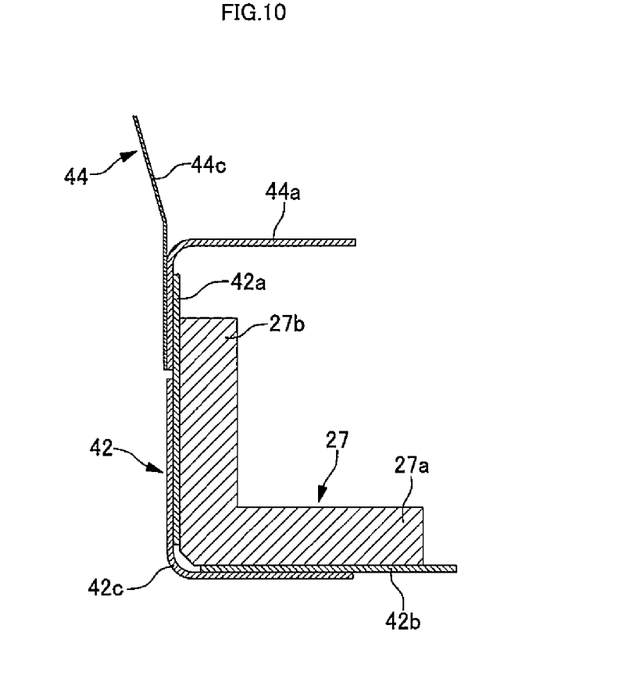
FIG. 10 is a cross-sectional view taken along the line X-X in FIG. 9.
Figure 11:
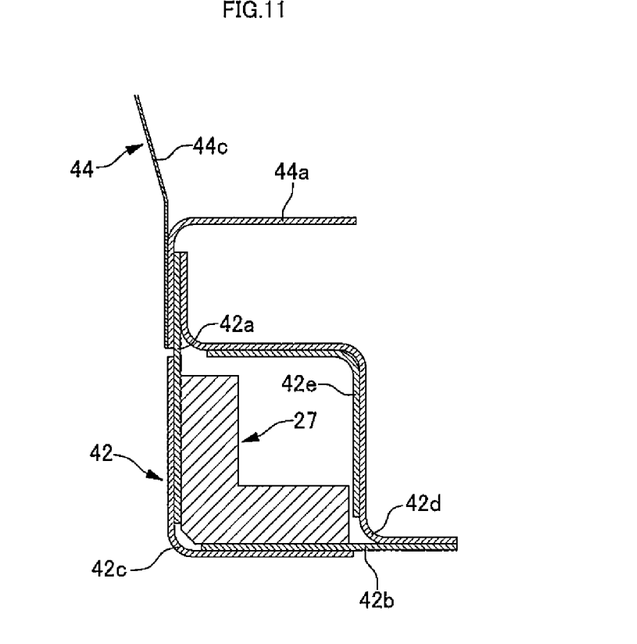
FIG. 11 is a cross-sectional view taken along the line XI-XI in FIG. 9.
Figure 12:
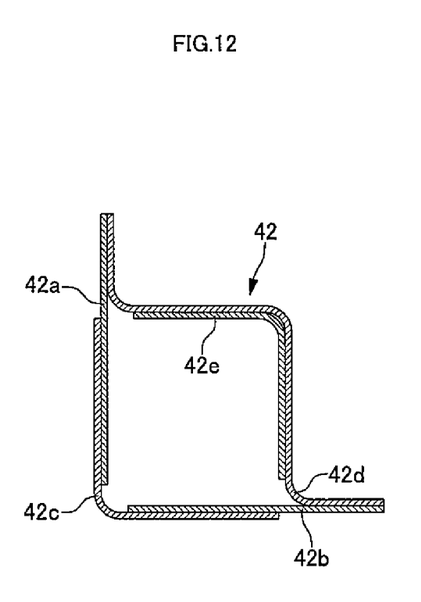
FIG. 12 is a cross-sectional view taken along the line XII-XII in FIG. 9.

Each of the corner post reinforcement members 27 is formed in an L-shaped cross-section, and reinforcement projecting portions 27a, 27b projecting toward the rear of the car body and the inside of the car body and joined to an upper face of the main end beam 25a and an upper face of the reinforcement end beam 25b are provided in lower portions of the corner post reinforcement member 27. Each of the corner posts 42 is formed by combining and joining: a front face member 42a, which is disposed on a front face of the corner post reinforcement member 27; a side face member 42b, which is disposed on an outer side face of the corner post reinforcement member 27; an outer face member 42c, which has an L-shaped cross-section and joins an outer edge of the front face member 42a and a front edge of the side face member 42b on an outer side; an inner face member 42d, which has a W-shaped cross-section and joins an inner edge of the front face member 42a and a rear edge of the side face member 42b on an inner side in such a manner as to cover an inner side of the corner post reinforcement member 27; and an inside reinforcement member 42e, which has an L-shaped cross-section and is disposed on the corner post reinforcement member side of the inner face member 42d. Upper half portions of the corner posts 42 are inclined on the upper side toward the rear of the car body in conformity with the inclination of the streamlined shape, and upper end portions of the upper half portions are joined to the opposite end portions of the upper reinforcement beam 41 by means of joint members 47.

Figure 13:
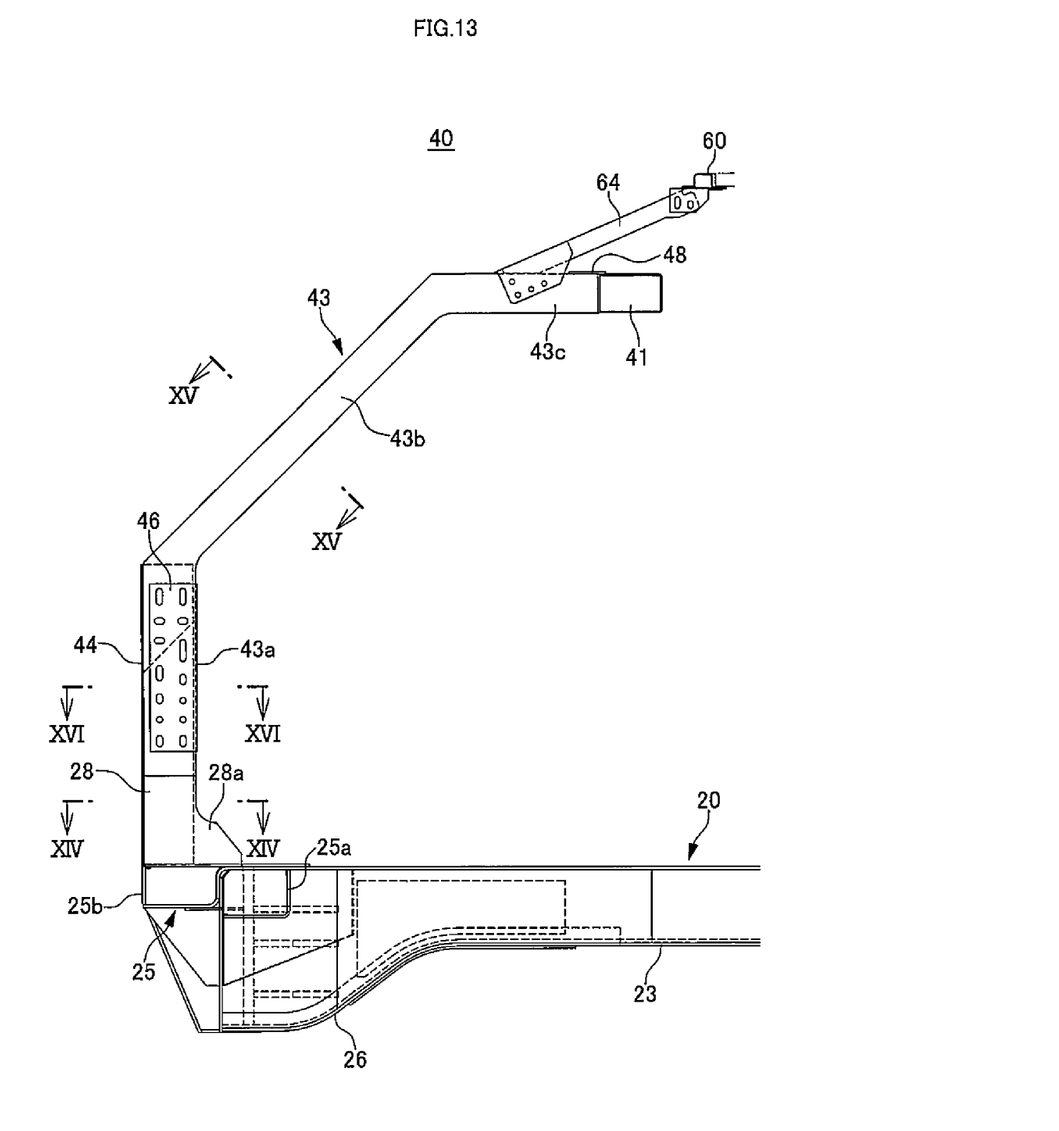
FIG. 13 is a cross-sectional view taken along the line XIII-XIII in FIG. 8.

Each of the end post reinforcement members 28 has a rectangular cross-section long in the front-rear direction in order to withstand impact from the front. A lower portion of each end post reinforcement member 28 is passed through a slit 25c, which is provided in the reinforcement end beam 25b projecting frontward, and is joined across the front face of the main end beam 25a and the front face of the coupler support frame 26. Further, reinforcement projecting portions 28a, which are joined to the upper face of the main end beam 25a, are provided on rear portions of the end post reinforcement members 28.

Figure 14:
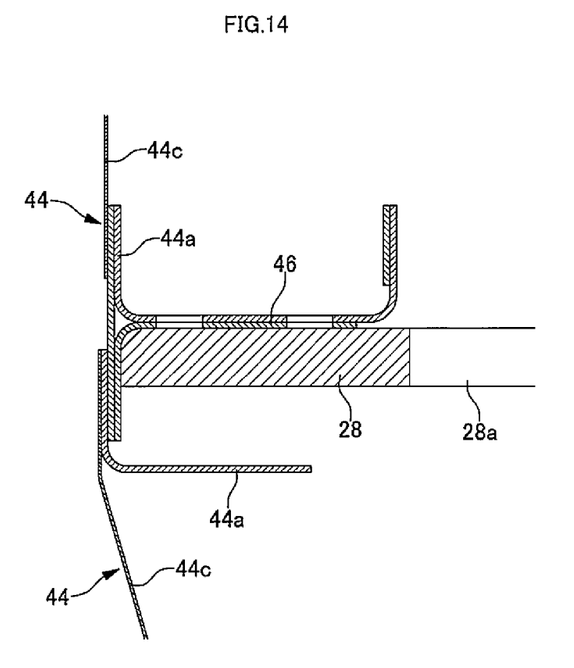
FIG. 14 is a cross-sectional view taken along the line XIV-XIV in FIG. 13.

Each of the end posts 43 is formed of a solid material made of steel, and includes: a lower post portion 43a, which extends in the vertical direction and is joined to the end post reinforcement member 28; a window opening post portion 43b, which is located on an inner side of the front window 15 and which has an upper portion inclined rearward; and an upper post portion 43c, which extends in the horizontal direction and has a rear end joined to the upper reinforcement beam 41. Each of the lower post portions 43a has a rectangular cross-section long in the front-rear direction in the same manner as the end post reinforcement members 28 to withstand impact from the front like the end post reinforcement members 28. The lower post portion 43a is joined in a state of being placed over a side face of an upper half portion of the end post reinforcement member 28 with two splice members 46, each having an L-shaped cross-section, arranged around the lower post portion 43a. The lower post portion 43a is thus joined to the end beam 25 with the end post reinforcement member 28 in between.

Figure 15:
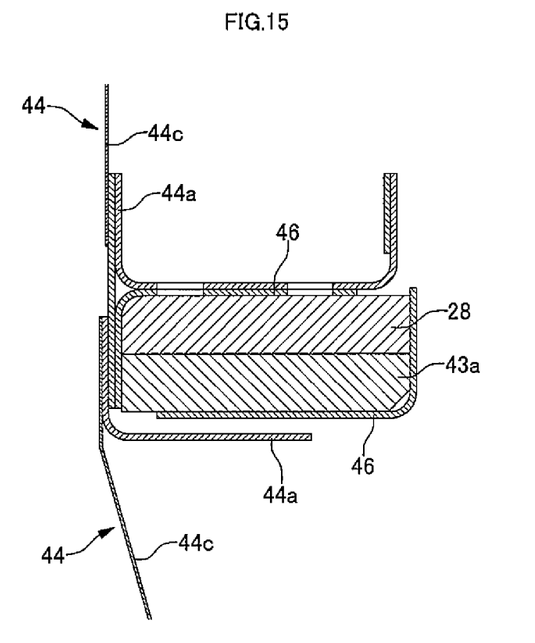
FIG. 15 is a cross-sectional view taken along the line XV-XV in FIG. 13.
Figure 16:
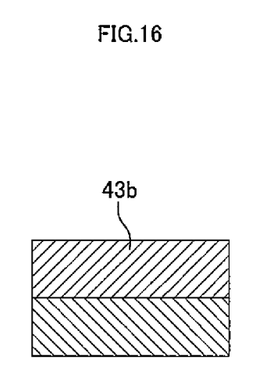
FIG. 16 is a cross-sectional view taken along the line XVI-XVI in FIG. 13.

Each of the window opening post portions 43b is provided to extend from an upper end of the lower post portion 43a while an upper portion of the window opening post portion 43b is inclined toward the rear of the car body in conformity with the inclination of the streamlined shape. The window opening post portion 43b is formed to have a smaller width dimension in the rail direction (the front-rear direction) than the width dimension of the lower post portion 43a in the rail direction. In addition, in the embodiment, a single window opening post portion 43b is formed by laminating two plate materials having the same thickness as that of the end post reinforcement members 28. Each of the upper post portions 43c extends from the rear upper end portion of the window opening post portion 43b toward the upper reinforcement beam 41 in the horizontal direction, and has a rear end portion joined to the upper reinforcement beam 41 by means of joint members 48. The upper post portion 43c has the same cross-sectional shape as that of the window opening post portion 43b.

As shown in FIG. 3, outside plates 12 having shapes corresponding to the corresponding structures are attached to outer sides of the structures, and rigs and interior decorations, including various instruments and seats, are provided inside and outside the structures. In addition, a passenger door 13 is provided in the door frame part 33 and a side window 14 is provided in the window frame part 34. A front window 15 is provided in a middle portion of the front face of the cab end structure 40 in the up-down direction, and a crew window 16 is provided in aside face of the cab end structure 40. A coupling hood 17 is provided around the gangway opening portion of the end structure 50. Moreover, couplers 18, which are supported by the coupler support frames 26, are provided respectively on lower portions of the opposite ends of the car body, and an anti-climber 19 is provided in the lower portion of the front face. By mounting required components such as the outside plates 12 inside and outside the rolling stock structure 11 as described above, the streamlined first rolling stock 10 with a rounded head portion having the driver's cabin at the center in the width direction is formed.

As described above, in the rolling stock 10 having ahead portion having a streamlined shape and provided with the driver's cabin in the center portion in the car-body width direction, the upper reinforcement beam 41, which is joined to the corner posts 42 and the end posts 43, is provided in the upper end portion of the rear portion of the cab end structure 40, and the lower half portions of the corner posts 42 and the end posts 43 are joined respectively to the corner post reinforcement members 27 and the end post reinforcement members 28 provided in the underframe 20. This makes it possible to significantly enhance the strength of the cab end structure 40. Then, setting the strength of the upper reinforcement beam 41, the joint strength between the corner posts 42 and the end posts 43, and the joint strength between the side structures 30 and the roof structure 60 at strengths enabling the car body to be lifted up via the upper reinforcement beam 41 makes it possible to easily lift up the head portion of the streamlined rolling stock 10 by use of a crane or the like. Moreover, coupling the roof structure 60 by means of the coupling members 64 also makes it possible to enhance the joint strength of the roof structure 60.

Furthermore, if eyebolts or hooks protruding above the roof are provided or screwed portions for eyebolts are provided in the opposite end portions of the upper reinforcement beam 41, these can be easily used as lifting portions used for a crane, making it possible to easily perform the lifting operation using a crane, such as wiring, in a short time. Therefore, only by preparing a general crane truck, it is possible to return a derailed rolling stock onto a rail, or remove the derailed rolling stock, and accordingly the time required for the recovery operation can be significantly reduced.

In particular, joining the lower end portions of the end post reinforcement members 28, to which the lower end portions of the end posts 43 are joined, to the front face of the main end beam 25a makes it possible to achieve a sufficient joint strength of the end posts 43 against an external force due to a frontal collision. Therefore, deformation and the like of the end posts 43, which couple the end beams 25 and the upper reinforcement beam 41, due to an external force can be prevented. Moreover, providing the front face reinforcement panels 44 on the lower half portions of the corner posts 42, which are joined to the corner post reinforcement members 27, and the end posts 43, which are joined to the end post reinforcement members 28, makes it possible to enhance the strength of the front head portion of the car body. Therefore, the driver's cabin can be securely protected, and the deformation of the corner posts 42 and the end posts 43 can be more securely prevented, thereby making it possible to securely lift up the underframe 20 via the corner posts 43 and the end posts 43 when lifting up the upper reinforcement beam 41.

In addition, as shown in the embodiment, in the rolling stock 10 having the streamlined shape and provided with the driver's cabin in the center portion in the car-body width direction, the window opening post portions 43b, which are provided on the front end portion of the cab end structure 40 and are located respectively on the opposite sides of a front face of the driver's cabin in the front window 15, are each formed to have a smaller width dimension in the rail direction. This eliminates the possibility that the driver's view through the front window 15 is largely obstructed by the window opening post portions 43b, and thus makes it possible to achieve a favorable state of the driver's view during the operation. Moreover, forming the end posts 43 including the window opening post portions 43b from solid members made of steel makes it possible to obtain sufficient strength even when the window opening post portions 43b have small cross-sectional dimensions.

Note that although the end structures may have any configurations, similar upper reinforcement beams may be provided to the end structures as well, which makes it possible to easily lift up the rolling stock by use of a crane.

EXPLANATION OF THE REFERENCE NUMERALS

10 first rolling stock
11 rolling stock structure
12 outside plate
13 passenger door
14 side window
15 front window
16 crew window
17 coupling hood
18 coupler
19 anti-climber
20 underframe
21 side beam
21a lower projecting piece
22 bolster beam
23 center beam
24 cross beam
15 end beam
25a main end beam
25b reinforcement end beam
25c slit
26 coupler support frame
27 corner post reinforcement member
27a, 27b reinforcement projecting portion
28 end post reinforcement member
28a reinforcement projecting portion
29 recess portion
30 side structure
31 side post
32 frame member
33 door frame part
34 window frame part
35 joint member
40 cab end structure
41 upper reinforcement beam
42 corner post
42a front face member
42b side face member
42c outer face member
42d inner face member
42e inside reinforcement member
43 end post
43a lower post portion
43b window opening post portion
43c upper post portion
44 front face reinforcement panel
44a vertical frame
44b horizontal frame
44c front face panel
45 front window opening portion
46 splice member
47 joint member
48 joint member
50 end structure
60 roof structure
61 long girder
62 rafter
63 roof board
64 coupling member

The invention claimed is:

1. A rolling stock having a car body formed by joining a cab end structure having a streamlined shape and an end structure respectively to opposite ends of an underframe, side structures, and a roof structure, wherein
the cab end structure includes:
a pair of corner posts having lower half portions joined respectively to a pair of corner post reinforcement member, which stand upright on opposite end portions of an end beam of the underframe, and upper half portions inclined toward rear of the car body;
an upper reinforcement beam extending in a car-body width direction, the upper reinforcement beam being joined to and laid between upper end portions of the pair of corner posts;
a pair of end posts having lower half portions joined respectively to a pair of end post reinforcement members, which stand upright on inner sides of the corner posts on the end beam, and upper half portions inclined toward the rear of the car body, extending from the inclined upper ends toward the rear of the car body in a horizontal direction, and having rear end portions being joined to the upper reinforcement beam;
front face reinforcement members coupling each corner post reinforcement member and the adjacent end post reinforcement member to each other, and the end post reinforcement members to each other, in the car-body width direction; and
a pair of coupling members respectively coupling upper portions of the pair of end posts and a front end portion of the roof structure, and
the upper reinforcement beam has such a strength that the car body can be lifted up from above.

2. The rolling stock according to claim 1, wherein the upper reinforcement beam includes a lifting portion for lifting by use of a crane.

3. The rolling stock according to claim 1, wherein the end post reinforcement members have lower end portions joined to a front face of the end beam.

4. The rolling stock according to claim 2, wherein the end post reinforcement members have lower end portions joined to a front face of the end beam.

* * * * *